(12) United States Patent
Juric

(10) Patent No.: US 8,763,808 B2
(45) Date of Patent: Jul. 1, 2014

(54) WATERING CAN

(76) Inventor: Igor Juric, Sisak (HR)

( * ) Notice: Subject to any disclaimer, the term of this patent is extended or adjusted under 35 U.S.C. 154(b) by 1122 days.

(21) Appl. No.: 12/597,180

(22) PCT Filed: Nov. 8, 2007

(86) PCT No.: PCT/HR2007/000036
§ 371 (c)(1),
(2), (4) Date: Oct. 23, 2009

(87) PCT Pub. No.: WO2008/129331
PCT Pub. Date: Oct. 30, 2008

(65) Prior Publication Data
US 2010/0116906 A1    May 13, 2010

(30) Foreign Application Priority Data

Apr. 24, 2007   (HR) .............................. P 20070179 A

(51) Int. Cl.
*B65D 21/00* (2006.01)
*B65D 21/04* (2006.01)
*A01G 25/14* (2006.01)

(52) U.S. Cl.
USPC ........... 206/509; 206/503; 206/505; 206/506; 206/510; 206/515; 206/519; 239/377

(58) Field of Classification Search
CPC ................ B65D 21/0212; B65D 2501/24554; A01G 25/14
USPC .......... 239/375–379; 206/518, 515, 510, 503, 206/506, 509, 519, 499; 220/770, 771, 756; 215/10; 222/143
See application file for complete search history.

(56) References Cited

U.S. PATENT DOCUMENTS

| | | | |
|---|---|---|---|
| 1,587,934 A | | 6/1926 | Bartlett |
| 2,896,809 A | * | 7/1959 | Metzger et al. ................. 220/553 |
| 3,392,874 A | * | 7/1968 | Peebles ......................... 206/514 |
| 3,463,353 A | * | 8/1969 | Peebles ......................... 206/514 |
| 3,587,915 A | * | 6/1971 | Theobald et al. .............. 206/201 |
| 4,204,596 A | * | 5/1980 | Davis ............................. 206/203 |
| 4,428,493 A | * | 1/1984 | McDonough ................. 220/555 |
| 5,086,917 A | * | 2/1992 | Dziersk et al. ................ 206/216 |
| 5,242,071 A | * | 9/1993 | Goebel ......................... 220/4.23 |
| 5,871,114 A | * | 2/1999 | Anderson et al. ........ 220/495.11 |
| 6,138,963 A | * | 10/2000 | Malvasio ....................... 248/111 |
| 7,290,651 B2 | * | 11/2007 | Irwin et al. .................... 206/216 |
| D649,786 S | * | 12/2011 | Lipfert et al. .................. D3/308 |

FOREIGN PATENT DOCUMENTS

| GB | 142993 | 5/1920 |
|---|---|---|
| GB | 2420490 | 5/2006 |

* cited by examiner

*Primary Examiner* — Dinh Q Nguyen
*Assistant Examiner* — Alexander M Valvis
(74) *Attorney, Agent, or Firm* — Dennis R. Haszko

(57) ABSTRACT

A watering can of appropriate shape consist of the main container (5) from which an open spout (6) extends, while the bottom wall (12) and the back edge of the main container continue into the extended can holder (7) with the holder opening (8). The main container widens from its bottom toward the top, while the extended can holder (7) becomes narrower from the bottom toward its top. The extended can holder wall creates a countersink (9) on the external side where into the extended handle of the next stacked can is put into. The open spout (6) has V-shaped cross section enabling the spout (6) to fit into the spout of the previous can during stacking.

13 Claims, 5 Drawing Sheets

WATERING CAN

DESCRIPTION OF THE INVENTION

1. Technical Field to which the Invention Relates

This invention refers to a watering can stacked in order to occupy as less space as possible during transport and storage. Pursuant to international patent classification it belongs to A01G 25/14 class.

2. Technical Problem

Technical issue being solved by this invention involves reduction of space occupied by watering cans if there are couple of cans to be stored, transported or displayed in shops.

It is strongly manifested in recent time due to heavier road traffic and rising prices of fuel and road-tolls that require more efficient and economic transport of goods.

3. The State of the Art

Solution of the above-mentioned technical problem not been proposed so far, however, it should be pointed out that there is one design of inflatable watering can which can be inflated or deflated like a balloon, as required.

It is not known whether the mentioned watering can has become available on the market taking into account that water or any other liquid have their own weight and therefore it is can be easily concluded that such inflatable watering can (with air) could contain only a smaller water amount to prevent its bursting.

In addition, such inflatable watering cans should be use with great caution to avoid thorny flowers in the garden, and their life time would not be very long, at least today, taking into account materials they are made of.

4. Essence of the Invention

The most important characteristic of this invention is design of a watering can that enables reduction of space occupied by stacked watering cans during transport and storage. Another goal is to achieve that such design of a watering cans enables conveying and dosing of larger amounts of liquid or various grains such as cattle feed or building materials.

DESCRIPTION IN DETAILS OF AT LEAST ONE MODE FOR CARRYING OUT OF THE INVENTION

Figure 1:
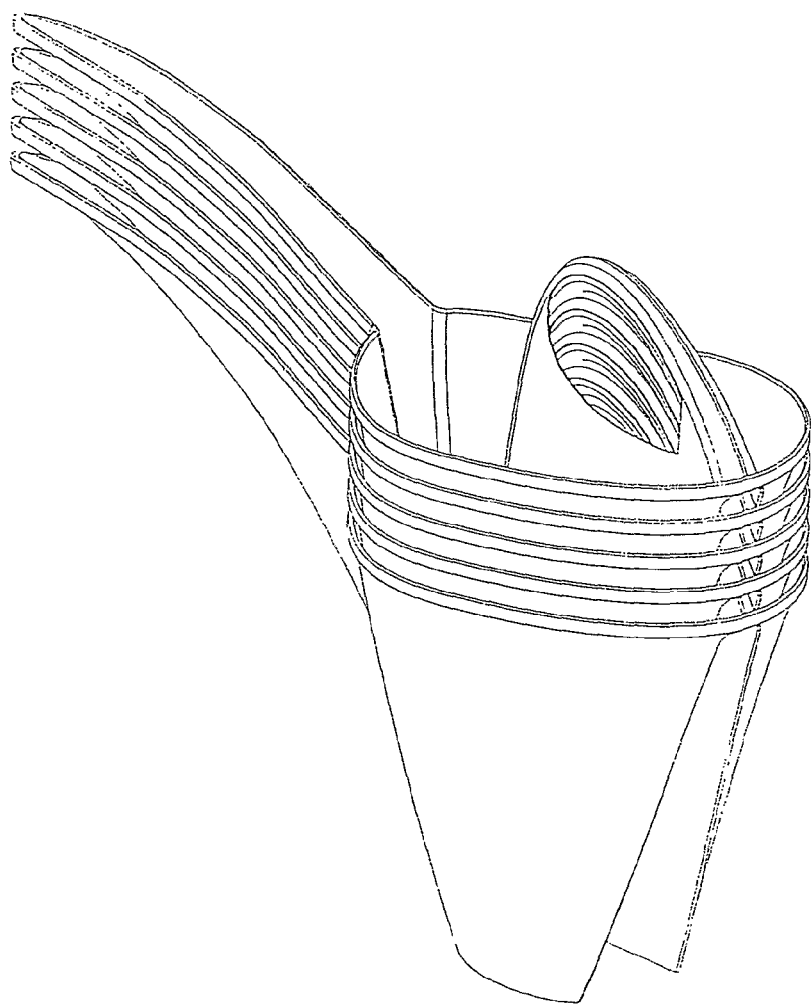
FIG. 1 Presentation of couple of watering cans stacked
FIG. 2 Spatial presentation of the back side of watering can
 Pos. 9.: Shape of countersunk back side of the main container (5)
FIG. 3 Spatial presentation of the upper lateral part of watering can.
 Pos. 5.: Main container;
 Pos. 6.: Open spout
 Pos. 7.: Extended can carrier with a handle opening;
 Pos. 8.: Handle opening.

As FIGS. 1, 2, 3, 4 and 5 show, a watering can is created in such a way that the main container (5), from which an open spout extends (6), is made so that the central bottom part (12) and the back edge of the main container are elevated above the upper edge (14) of the main container creating an extended can holder (7) with a handle opening (8).

The main container (5) becomes wider from the bottom to its top, while the extended can holder (7) narrows down from the bottom to the top. The extended can holder (7) forms on the external side (9) wherein the extended can holder (7) of the next stacked can is put into. In addition, the spout (6) has V-shaped cross section so it can be easily stacked onto the previous can as is readily apparent from FIG. 1.

Figure 3:
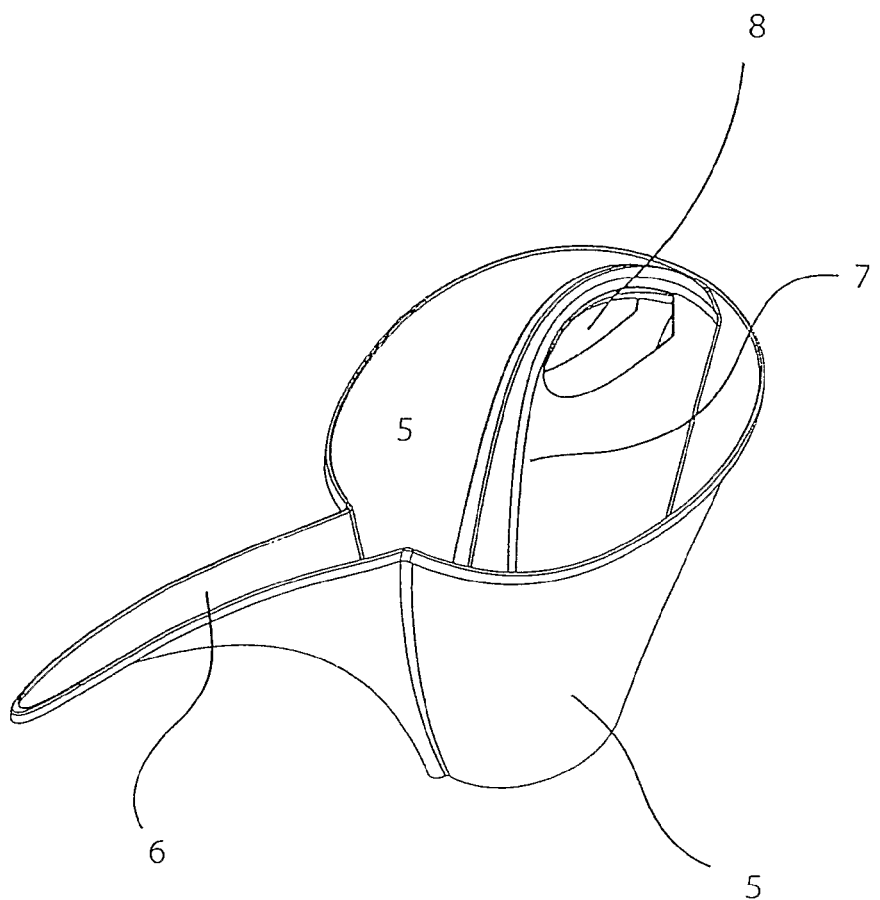

With further reference to the invention as clearly visible in FIG. 3, there are shown the main container (5) and spout (6) which together form a space for containing water. It is clear that the space in which water will exist is a contiguous space such that water can flow from the main container (5) into the spout (6) when the watering can is tilted towards the spout (6). With further regard to FIG. 5, it is clear that the main container (5) is configured to include two chambers. Similar to the spout (6) which includes a V-shaped cross section, each chamber (at right and at left in FIG. 5 and each denoted by the element (5)) is also V-shaped in cross section. The central bottom part (12) is a flattened area that exists at the bottom of each of the two chambers of the main container (5) shown at the same level in each chamber. This flattened area forming the central bottom part (12) provides extensions of a base (visible at the bottom of the side view seen in FIG. 4) by which the watering can is placed upon a flat surface.

Figure 5:
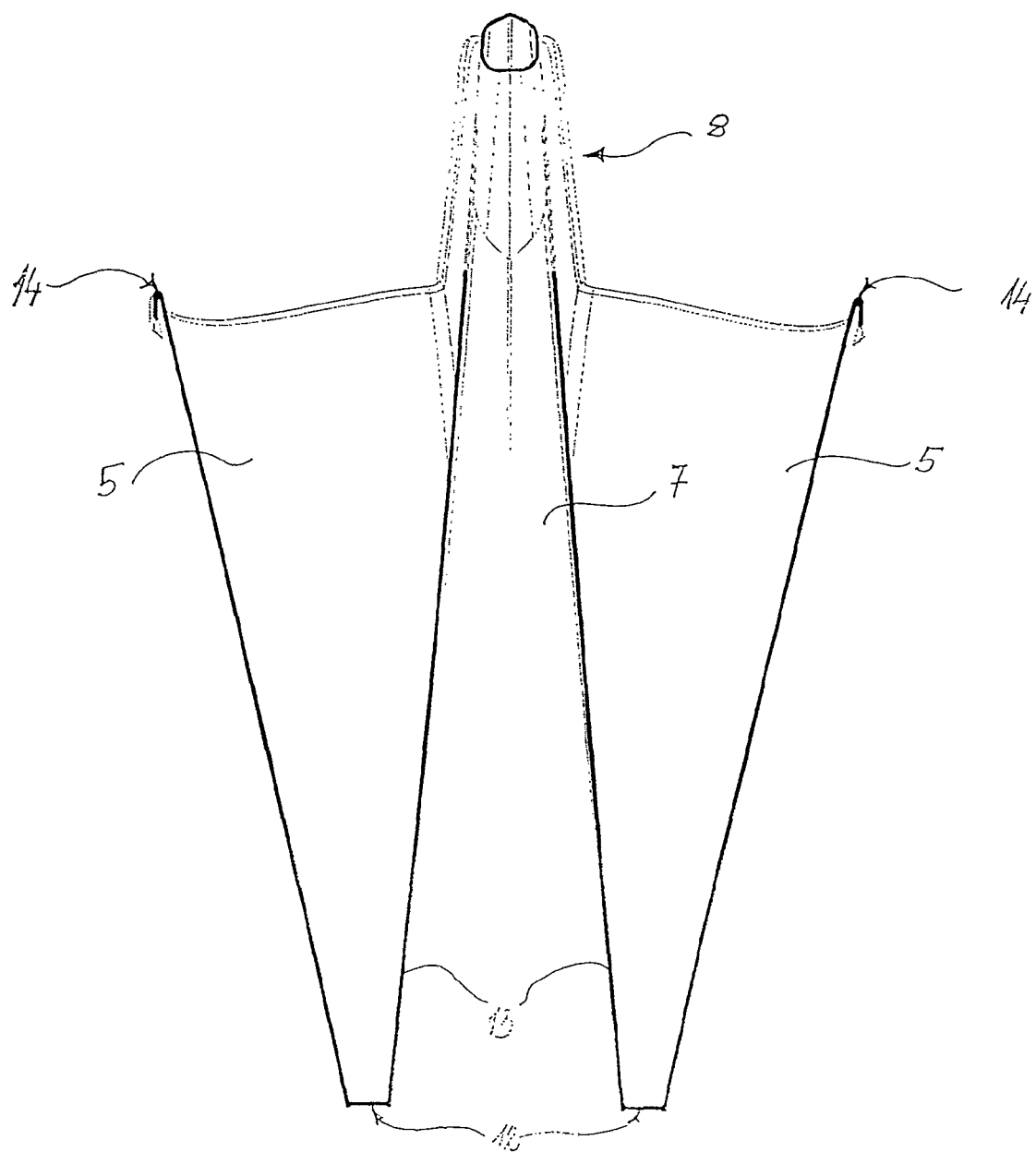
FIG. 5: Cross section along transversal axis
 Pos. 12.: Container bottom;
 Pos. 13.: Elevated wall of the container bottom;
 Pos. 14.: Upper edge of container.

With further reference to FIGS. 3 and 5, it is readily apparent to one skilled in the container art that any liquid (i.e., water) which is placed within the watering can will first fill the area of the main container (5) in a manner that evenly distributes such fluid between the two chambers of the main container (5). Because the main container (5) and the spout (6) are contiguous as shown, the fluid level will build and its surface will widen as fluid reaches the upper edge (14) of the watering can. Once filled, the watering can will generally contain a balanced amount of water in each chamber of the main container assuming, of course, that the central bottom part (12) is resting upon a generally level surface (not shown). It should therefore be readily understood that when the watering can is tipped by a user via the handle (11) so as to pour off water held within the watering can, the water will evenly drain from each chamber of the main container (5).

Figure 4:
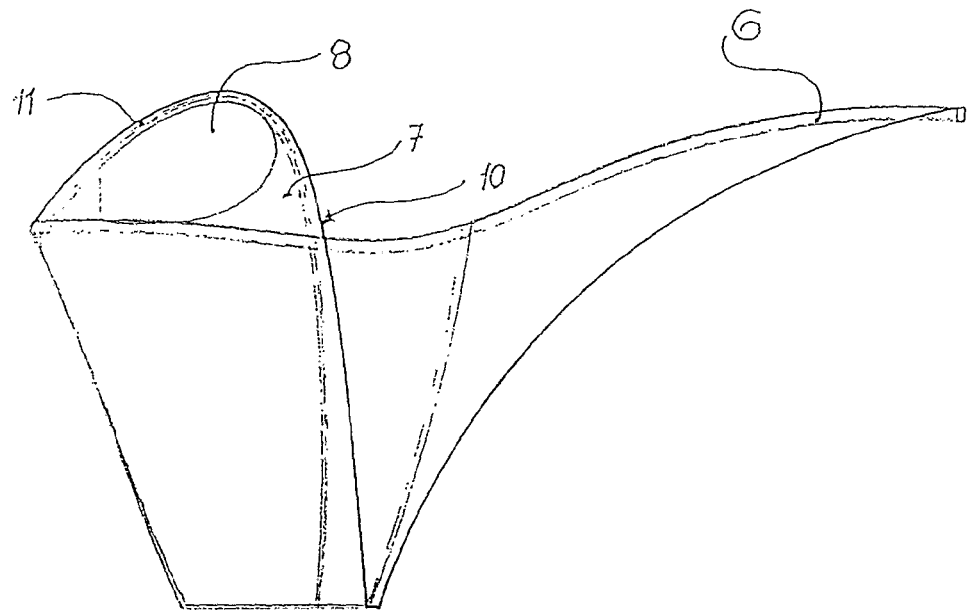
FIG. 4 Cross section along longitudinal axis
 Pos. 10.: Shape of interior circumference of elevated walls of the bottom central part (12) and back wall of the main container (5)
 Pos. 11.: Handle.

With further reference to FIG. 4, the side view of the watering can clearly shows that the handle opening (8) and, in particular, the topmost area of the handle (11) rise to the same horizontal level as the topmost area of the spout (6). It should be readily apparent that this configuration promotes balance while pouring water from the watering can. This balanced and even distribution of water is further due to the symmetrical shape of the chambers of the main container (5) and spout (6) and the location of the handle (11) being centralized relative to the mass of water held within the watering can.

Figure 2:
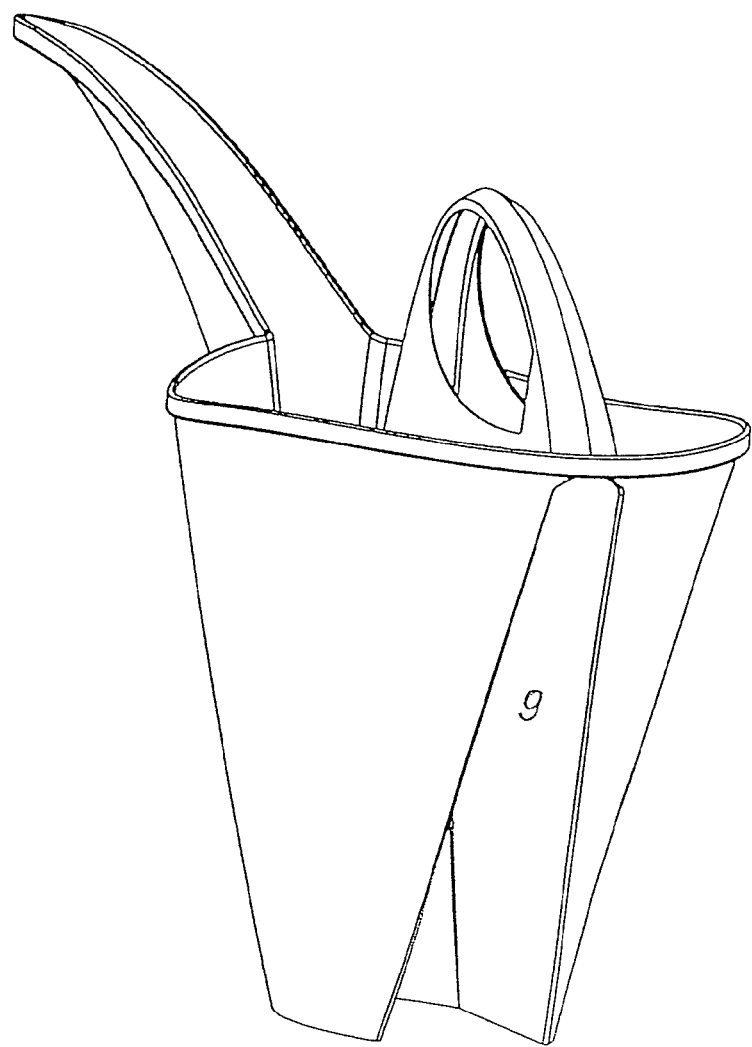

From the figures, it is also readily apparent that the elevated walls (13) of the container bottom form the shape of the countersunk back side (9) of the main container (5) as is evident in FIG. 2. This particular configuration provides for the stackability shown in FIG. 1 when more than one watering can is provided one upon another. Here, it is readily apparent that the V-shaped cross section of the two chambers of the main container (5) and spout (6) allow for secure nesting of one watering can upon another.

With further reference to FIG. 3, it is shown that the main container (5) when viewed from directly above the watering can is of a generally U-shaped configuration. It is commonly understood that a U includes two upright lines and a base connecting the upright lines. In the context of the present watering can as shown, each chamber of the main container (5) corresponds to the two upright lines of the U. Further, it is therefore readily apparent that the spout (6) extends from the base of the U in regard to the U-shaped main container (5). Accordingly, the flow of water when the watering can is poured follows a path from the areas of U-shaped main container (5) corresponding to the two upright lines of the U towards the base of such U and along the line created by the spout (6). In this manner, it may be said that upon pouring the direction of water flow is along a lengthwise axis of each chamber of the main container (5) and subsequently along a lengthwise axis of the spout (6) whereby each axis is parallel to one another. This configuration clearly serves to ensure a balanced pouring and uniform emptying of the two chambers of the main container (5).

The Way in which the Invention is Capable of Application

Application of the invention is made by standard injection moulding of thermo-plastic materials for which appropriate tool with dimensions matching the size and shape of the product has to be produced.

What is claimed is:

1. A watering can comprising:
    a container bottom of said watering can, said container bottom including a U-shaped surface which forms a flat area to support horizontal placement of said watering can, said U-shaped surface including two tips located at a rear of said watering can and a base located towards a front of said watering can;
    a spout, said spout being elongated and extending in a continuous arcuate manner from a center of said base of said container bottom to an outermost area of said spout located remote from said center of said base; and
    a main container having exterior walls horizontally extending from said rear of said watering can to said spout, said main container also having interior walls extending vertically from said container bottom, said interior walls forming an extended can carrier with a handle opening elevated above an upper edge of said main container, said interior walls and said exterior walls forming two symmetrical V-shaped chambers of said main container, each V-shaped chamber widening from said container bottom to said upper edge of said main container and, correspondingly, said extended can carrier narrowing from said container bottom to said handle,
    wherein said exterior walls of said extended can carrier form a countersink extending toward and interior of said main container,
    wherein said countersink is shaped so as to enable subsequent watering cans to be stacked in a nesting manner one upon another.

2. The watering can as claimed in claim 1, wherein said countersink extends vertically from said container bottom past said upper edge of said main container to an interior of said handle and also extending horizontally from said spout toward said extreme opposite of said spout.

3. The watering can as claimed in claim 2, wherein said spout is of V-shaped cross section so as to enable spouts of said subsequent watering cans to rest one upon another during stacking.

4. The watering can as claimed in claim 1, wherein said V-shaped chambers of said main container together with said spout form a contiguous water storage space for a fluid such that said fluid evenly exits said V-shaped chambers through said spout upon manual pouring of said watering can via said handle.

5. The watering can as claimed in claim 1, wherein said spout extends to a position located laterally and vertically extreme from a top-most edge of said handle.

6. A watering can comprising:
    a container bottom of said watering can, said container bottom including a U-shaped surface which forms a flat area to support horizontal placement of said watering can, said U-shaped surface including two tips located at a rear of said watering can and a base located towards a front of said watering can;
    a spout, said spout being elongated and extending in a continuous arcuate manner from a center of said base of said container bottom to an outermost area of said spout located remote from said center of said base; and
    a main container having exterior walls horizontally extending from said rear of said watering can to said spout, said exterior walls including an upper peripheral edge, said main container also having interior walls extending vertically from said container bottom, said interior walls forming an extended can carrier with a handle opening elevated completely above and surrounded by said upper peripheral edge, said interior walls and said exterior walls forming two symmetrical V-shaped chambers of said main container, each V-shaped chamber widening from said container bottom to said upper peripheral edge and, correspondingly, said extended can carrier narrowing from said container bottom to said handle,
    wherein said interior walls of said extended can carrier form a void between each said V-shaped chamber, said void extending from said base of said container bottom to an interior of said handle, and said void providing a countersink shaped so as to enable subsequent watering cans to be stacked in a nesting manner one upon another.

7. The watering can as claimed in claim 6, wherein said spout is of V-shaped cross section so as to enable spouts of said subsequent watering cans to rest one upon another during stacking.

8. The watering can as claimed in claim 6, wherein said V-shaped chambers of said main container together with said spout form a contiguous water storage space for a fluid such that said fluid evenly exits said V-shaped chambers through said spout upon manual pouring of said watering can via said handle.

9. The watering can as claimed in claim 6, wherein said spout extends to a position located laterally and vertically extreme from a top-most edge of said handle.

10. A watering can comprising:
    a container bottom of said watering can, said container bottom including a U-shaped surface which forms a flat area to support horizontal placement of said watering can, said U-shaped surface including two tips located at a rear of said watering can and a base located towards a front of said watering can;
    a spout, said spout being elongated and extending in a continuous arcuate manner from a center of said base of said container bottom to an outermost area of said spout located remote from said center of said base;
    a main container having exterior walls horizontally extending from said rear of said watering can to said spout, said exterior walls including an upper peripheral edge, said main container also having interior walls extending vertically from said container bottom, said interior walls forming an extended can carrier with a handle opening elevated completely above and surrounded by said upper peripheral edge, said interior walls and said exterior walls forming two symmetrical V-shaped chambers of said main container, each V-shaped chamber widening from said container bottom to said upper peripheral edge and, correspondingly, said extended can carrier narrowing from said container bottom to said handle; and a void formed between each said V-shaped chamber by said interior walls of said extended can, said void extending from said base of said container bottom to an interior of said handle, and said void providing a countersink shaped so as to enable subsequent watering cans to be stacked in a nesting manner one upon another.

11. The watering can as claimed in claim 10, wherein said spout is of V-shaped cross section so as to enable spouts of said subsequent watering cans to rest one upon another during stacking.

12. The watering can as claimed in claim 10, wherein said V-shaped chambers of said main container together with said spout form a contiguous water storage space for a fluid such that said fluid evenly exits said V-shaped chambers through said spout upon manual pouring of said watering can via said handle.

13. The watering can as claimed in claim 10, wherein said spout extends to a position located laterally and vertically extreme from a top-most edge of said handle.

\* \* \* \* \*